Patented Nov. 15, 1949

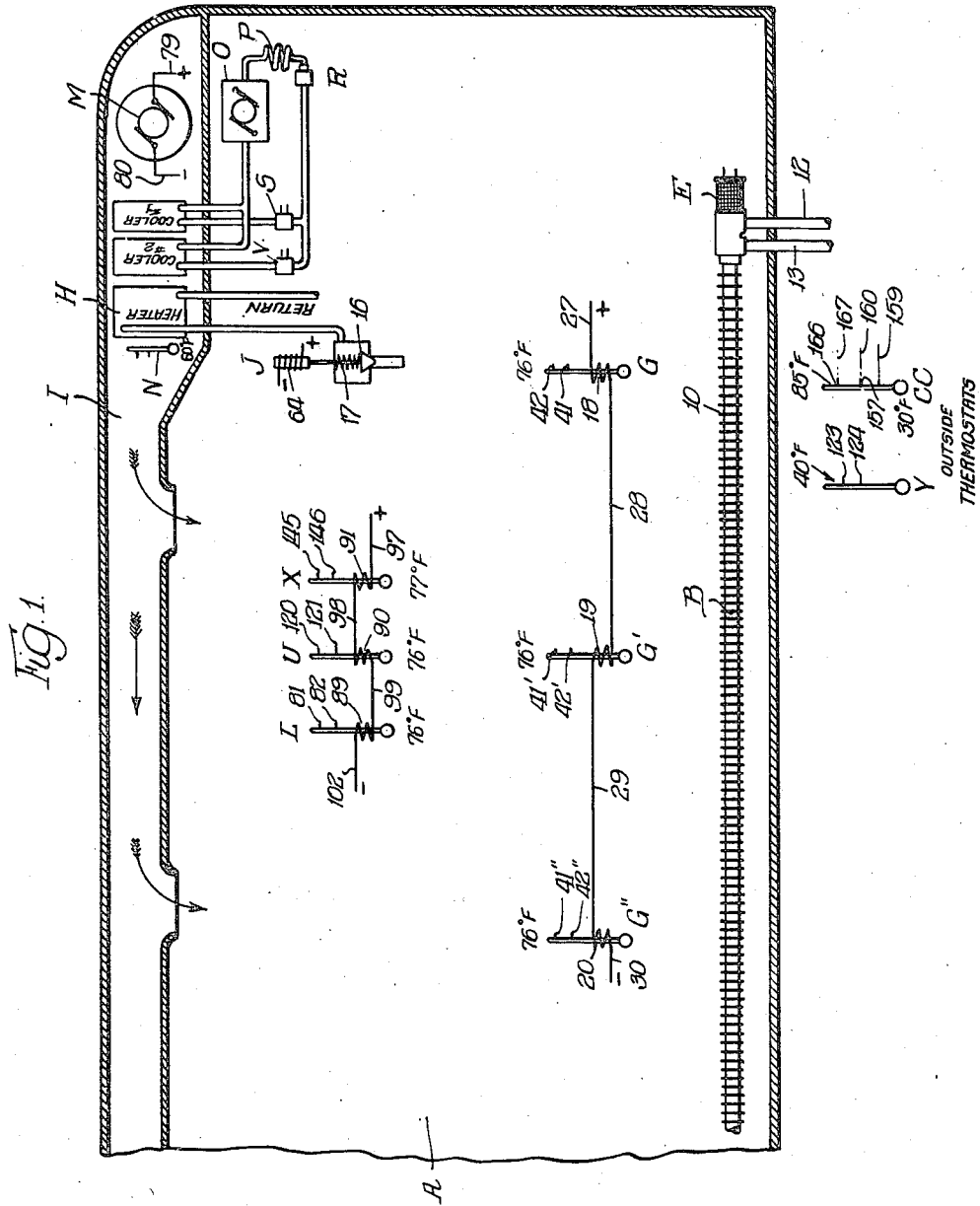

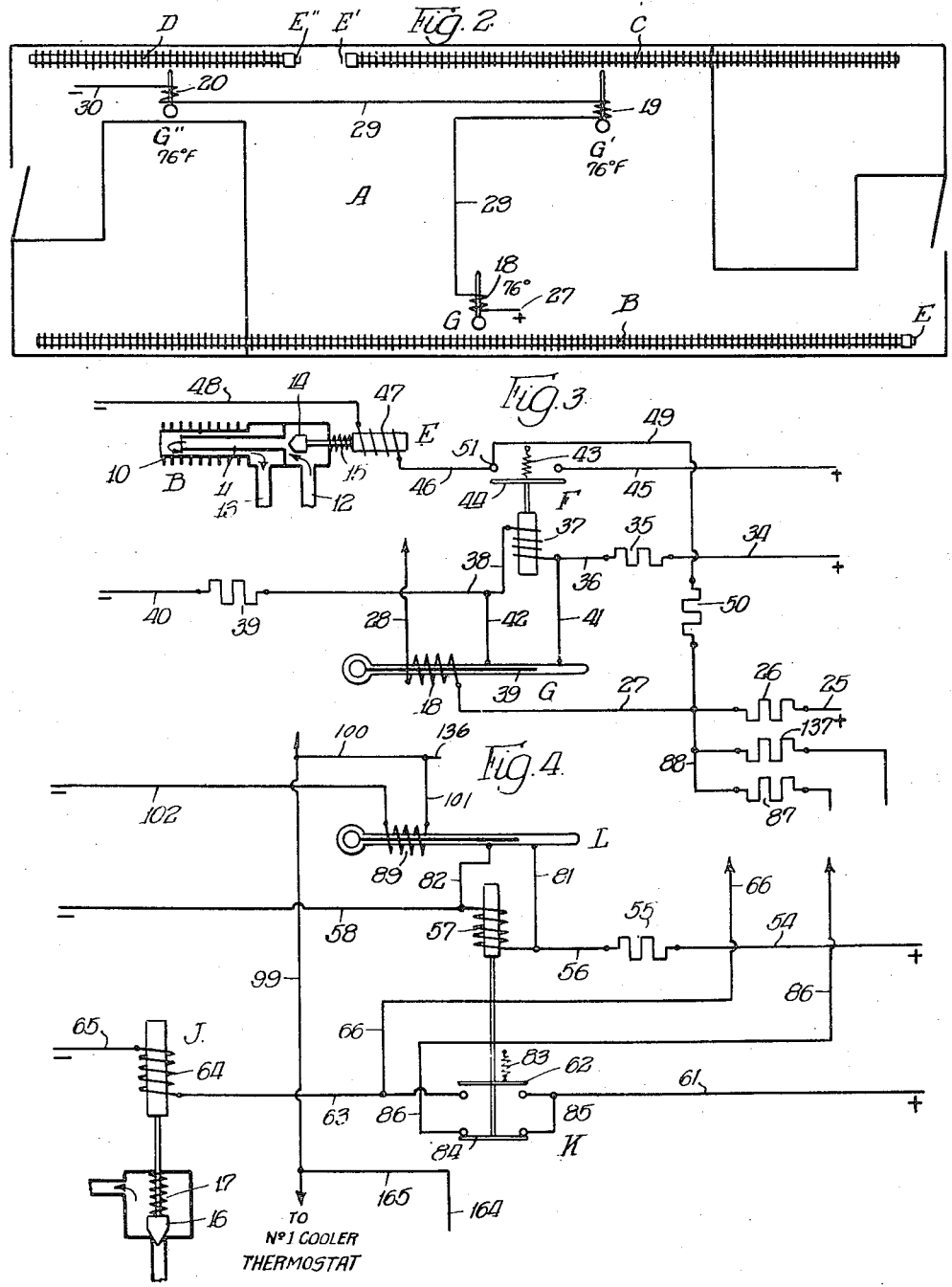

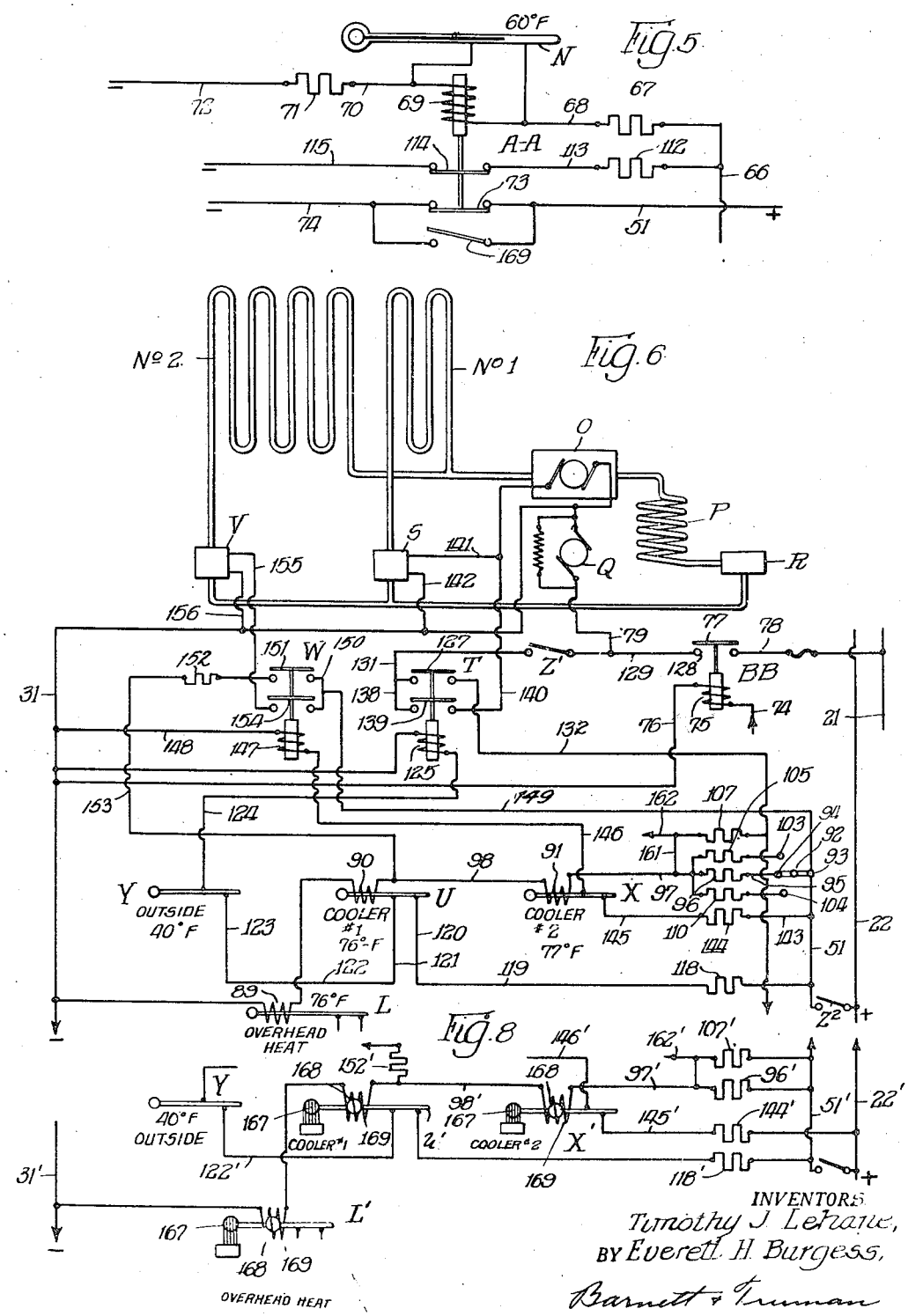

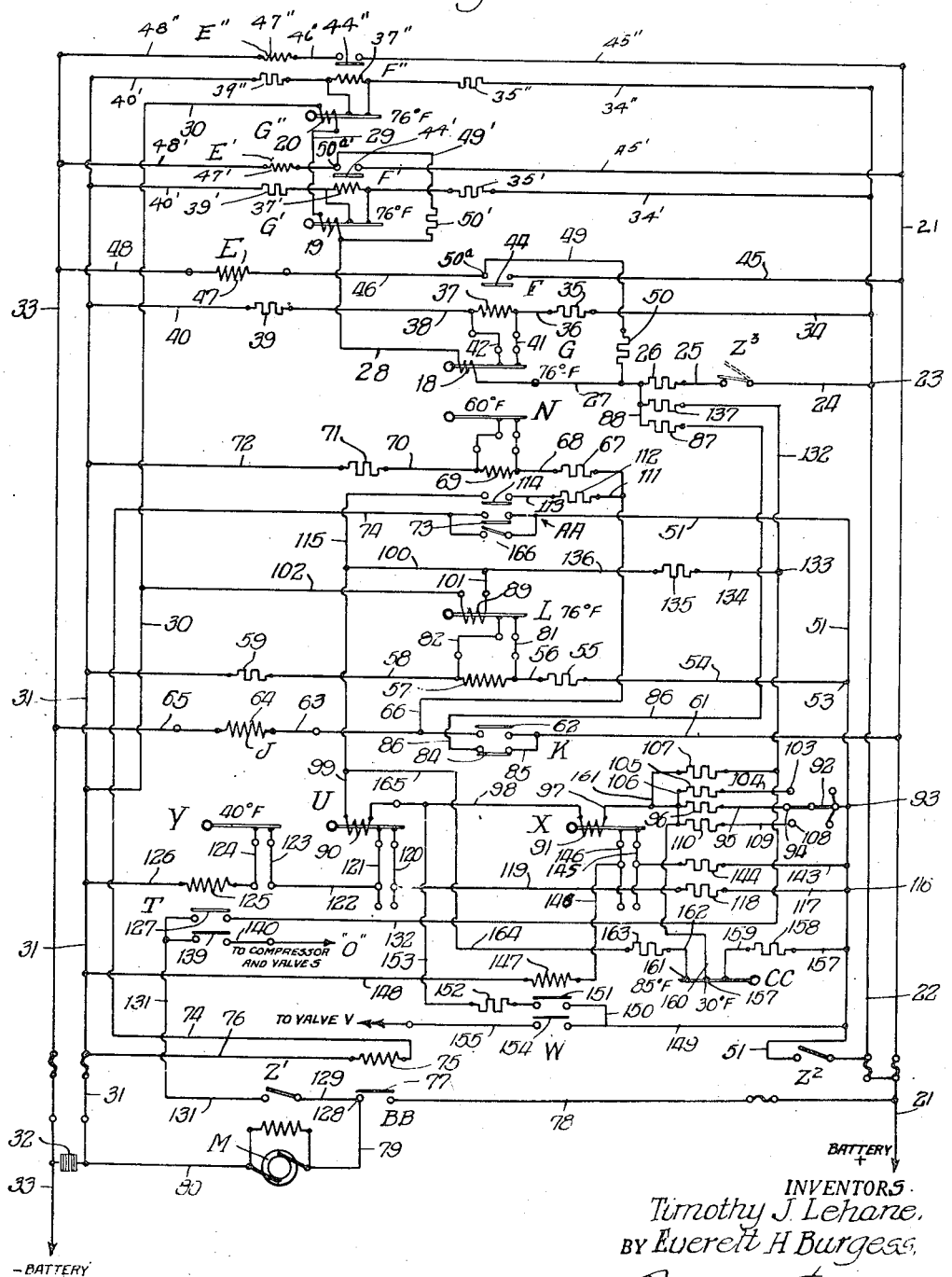

2,488,209

UNITED STATES PATENT OFFICE 2,488,209

AUTOMATIC TEMPERATURE CONTROL

Timothy J. Lehane and Everett H. Burgess, Chicago, Ill., assignors, by mesne assignments, to Vapor Heating Corporation, a corporation of Delaware Application May 11, 1944, Serial No. 535,105

15 Claims. (Cl. 257—3)

This invention relates to an electric system for controlling the operation of apparatus for heating and/or cooling an enclosed space.

The invention is disclosed in connection with the special conditions which are encountered in connection with the heating and ventilating of a railway car, but it should be understood that the invention is equally applicable to other situations where similar conditions prevail.

A principal object of the invention is to provide an improved electric control system for controlling a combined heating and cooling apparatus whereby the system will automatically discontinue functioning as a heating system at a predetermined temperature of the enclosed space and thereafter function as a cooling and ventilating system.

Another object is to provide an improved control system for use in controlling a combination heating and cooling apparatus whereby there will be no repeated reversals in operation of the combination apparatus during the transition period when it changes from its heating to its cooling function or from its cooling to its heating function. In other words, when the combination heating and cooling apparatus starts functioning as a cooling system, it will continue said cooling function until there is a definite change in conditions to warrant the return to the heating function.

Another object is to provide a control system in which provision is made for altering the temperature settings of certain of the control thermostats when this is necessary or desirable to provide a comfortable temperature. According to one embodiment of the invention the temperature settings of said thermostats may be raised or lowered by manually operated means. According to another embodiment, this adjustment is accomplished automatically by means of thermostats which respond to both the temperature and humidity of the atmosphere within the enclosed space whose temperature is being controlled.

Another object is to provide in a control system of the above character novel and improved means which function to vary the controlled inside temperature in relation to variations in the outside temperature. In this connection the invention includes a thermostat responsive to the outside temperatures which thermostat is so connected with the controls of the combined heating and controlling apparatus that the control thermostats for controlling the heating function of the system will be automatically adjusted to increase the temperature settings when the outside temperature moves above or below a predetermined minimum and which will automatically adjust the settings of the cooling control thermostats within the car when the outside temperature moves above or below a predetermined maximum.

The control system briefly described includes a plurality of thermostats arranged at different locations within the temperature control space so as to respond to the temperature at the various locations. One group of these thermostats is preferably arranged in the lower portion of the enclosed space so as to respond particularly to the temperature near the floor level thereof. These thermostats are so connected in the system as to control the supply of heating medium to a plurality of floor radiators, but subject to certain influences imposed upon them, by the functioning of other controls of the system. The thermostats are preferably of the mercury column type and are provided with electrically energized auxiliary heaters cooperatively connected, preferably, but not necessarily in series so that all floor temperature responsive thermostats will have the same adjustment and thereby function at the same temperature, for example 76° F. In addition to the floor radiators there is provided an overhead heating system from which the heat is blown, by means of a fan, into the enclosed space whose temperature is being controlled. The operation of the fan is controlled by a temperature responsive element arranged near the overhead heater so that the fan will be inoperative any time that the temperature adjacent the overhead heater falls below a predetermined minimum, for example 60° F., while the heating apparatus is functioning. However, when the temperatures of the heat control thermostats are such as to shut off the supply of heat, the fan will function to pass air through the cooling apparatus. The operation of the overhead heater is controlled by a thermostat arranged in a suitable location in the temperature control space and has a setting corresponding to the setting for the floor thermostats, for example 76° F. The last mentioned thermostat is cooperatively connected with a pair of thermostats for controlling a split evaporator cooling system which includes a No. 1 cooler and a No. 2 cooler. A thermostat for controlling the No. 1 cooler has the same setting as the overhead heater thermostat, for example 76° F., so that immediately upon the functioning of the overhead heating thermostat, the No. 1 cooler of the cooling apparatus is set into operation. During this period of transition from the heating to the cooling function all heating controlled thermostats are adjusted to function at a temperature substantially below the normal setting of 76° F. so that all heating apparatus will be discontinued and remain inoperative for a suitable period so as to avoid the repeated starting of the compressors and other operating machinery of the cooling system. In other words, when the cooling function of the system is in control, it will hold control until conditions are definitely changed to warrant returning the control to the heating function. The No. 2 cooler is controlled by a thermostat which is responsive to a slightly higher temperature. This thermostat functions only to operate a valve for supplying cooling medium to No. 2 cooler and, therefore, can be opened and closed repeatedly without placing an undue burden on the electric system. Consequently, the thermostat for controlling the No. 2 cooler is set to function slightly higher than the thermostat for No. 1 cooler and is adapted to cut the No. 2 cooler into and out of the system as the temperature of the car may demand. The thermostat for controlling the overhead heater and the pair of thermostats for controlling the cooling function of the system are provided with electrically energized auxiliary heaters which are cooperatively connected, preferably, but not necessarily, in series whereby these thermostats may be adjusted collectively as a unit to meet transitory or temporary requirements due to changes in relative humidity of the atmosphere within the control space or other causes which make such adjustment desirable in order to provide comfort for the occupants of the space. The above adjustments may be effected by manual operation or by automatic means to be hereinafter described.

A further object of the invention is to provide a control system of the above character in which the several parts cooperate with each other and otherwise function in the manner above briefly described.

The invention is illustrated in certain preferred embodiments in the accompanying drawings wherein:

Fig. 1 is a vertical section through a portion of a railway car, or other enclosed space showing somewhat diagrammatically an arrangement of floor heaters, an overhead heater and a split evaporator cooling system together with certain of the temperature responsive elements for controlling the operation of the heating and cooling apparatus.

Fig. 2 is a plan view of one arrangement of floor radiators within the enclosed space.

Fig. 3 is a partial wiring diagram showing the electric circuits for controlling the supply of heating medium to one of the floor radiators.

Fig. 4 is a similar wiring diagram of the means for controlling the supply of heating medium to the overhead radiator.

Fig. 5 is a wiring diagram showing a thermostat and a relay for controlling the operation of the fan in connection with the overhead heater.

Fig. 6 is a diagram showing the split evaporator cooling system together with the wiring and temperature responsive means for controlling the function of the said cooling system.

Fig. 7 is a wiring diagram of the control system as a whole; and

Fig. 8 is a fragmentary diagram showing the changes in the wiring when thermostats of the wet and dry bulb type are employed as controls for the overhead radiator and for the cooling apparatus.

Referring first to the floor radiators, the overhead radiator and the air cooling coils shown in Fig. 1 of the drawing: The enclosed space whose temperature is being controlled is illustrated herein as a railway passenger car designated by the reference letter A. The several floor radiators are designated B, C, and D. They are, except for size, of identical construction. It will, therefore, be necessary to describe the construction of one radiator only. Each of these radiators comprises a finned outer pipe 10 and an inner pipe 11. The supply of heating medium, for example, steam, enters the radiator through the inlet pipe 12 and passes through the inner pipe 11 and returns through the outer pipe 10 to the exhaust 13, as indicated by arrows in Fig. 3. The supply of heating medium to the radiators is controlled by a valve 14 which is normally held in its open position by means of a spring 15 and is closed by means of a solenoid E.

The valve 14 is normally held open so that in the event of failure of the control system, for any reason, steam will be supplied to the floor radiators and, therefore, prevent freezing of the various traps and other devices of the radiators in which condensation of steam may collect.

The solenoid E is controlled by the operation of a relay F which in turn is controlled by a thermostat G. The electric circuits for energizing the solenoid E and the relay F will be described hereinafter. It will be sufficient at this time to indicate that the three thermostats G, G' and G'' are set to function at the same temperature, to-wit, the room temperature plus sufficient added heat to total 76° F. at the thermostats. However, because of their arrangement at different locations in the temperature controlled space and, therefore, being subject to variations in temperature, they may function independently to supply or shut off steam to the particular radiator which they control.

The overhead heater is designated in Fig. 1 by the reference letter H and may be of any suitable construction. It is preferably arranged in an overhead duct I which extends along the upper portion of the enclosed space. Heating medium, for example, steam is supplied to the radiator H by means of electrically controlled valve 16. The valve is normally held in its closed position by means of a spring 17, but is opened by a solenoid J which is energized by means of a relay K (Figs. 4 and 7) which in turn is controlled by the overhead thermostat L. The heat from radiator H is carried into the car by means of a motor driven fan M, the functioning of which is controlled by a thermostat N set to function at a relatively low degree, for example 60° F. and positioned in close relation to the radiator H so that any time the temperature adjacent the radiator drops below 60° F., the circuits to the motor driven fan M will be broken. The said fan M is made ineffective by thermostat N only when the thermostat L is below its functioning temperature. Consequently, the fan M is permitted to operate regardless of the thermostat N when the cooling apparatus is functioning.

The cooling system of the car is of the split evaporator type composed of No. 1 cooling coil and No. 2 cooling coil, the latter of which is preferably about three times the capacity of No. 1 coil, a compressor O, a condenser coil P, a fan Q for cooling the condenser coil, and a receiving chamber R. The supply of refrigerant to No. 1 coil is controlled by the electrically actuated valve S which is controlled by a relay T, the latter of which in turn is controlled by a thermostat U. The relay T, in addition to controlling the actuating circuit for the valve S, also controls the actuating circuit for the compressor O and the fan Q for cooling the condenser P.

The supply of refrigerant to the No. 2 coil is controlled by a valve V, the energizing circuit of which is controlled by a relay W which in turn is under the control of the thermostat X which is normally set to function at a temperature slightly higher than the thermostat U. The various electric circuits for actuating the relays T and W will be described in detail in connection with the functioning of the system.

The thermostat U for controlling the No. 1 cooler is connected in series with a thermostat Y responsive to the outside temperature. Consequently the No. 1 cooling coils and operating mechanism associated therewith remains inoperative any time that the outside temperature is below the functioning temperature of the thermostat Y, for example 40° F.

*Floor heat only*

The operation of the various controls of the system will be described first in connection with the heating function. Inasmuch as the floor radiators are designed for operation independently of the overhead radiator H, when the car is out of service, the first description will relate to the operation of the floor radiators B, C and D under the above conditions. In order to facilitate independent operation of the floor radiators, the control system is provided with a manually operated master switch having three simultaneously operable switch arms $Z^1$, $Z^2$, $Z^3$. The switch arm $Z^1$ opens and closes a circuit leading to the operating mechanism of the cooling apparatus. The switch arm $Z^2$ opens and closes a main branch for supplying current to the automatic operator of the overhead heating and cooling apparatus. Switch arm $Z^3$ controls a circuit leading to the floor radiator control when the floor radiators are operated independently of the overhead radiator. The switch arm $Z^3$ is moved from one position to another simultaneously with the operation of switch arms $Z^1$ and $Z^2$, but is positioned so that it will close whenever the master switch is turned to a position to open the switch arms $Z^1$ and $Z^2$ to discontinue the automatic operation. In Fig. 7 of the drawing the switch arm $Z^3$ is closed and the switch arms $Z^1$ and $Z^2$ are open.

It will be assumed, for the present description, that thermostats G, G', G'' are open at their contacts. Under this condition the steam supply valves 14 for the radiators B, C and D will be open to admit steam to the radiators. This condition will continue until the temperatures of the enclosed space plus an amount of heat added to the thermostats G, G', G'' is sufficient to cause them to function and thereby close the steam valves. The auxiliary heat is supplied to the several thermostats by means of electric heaters 18, 19 and 20 connected in series in a circuit leading from positive line 21, branch lead 22, to terminal 23, thence through wire 24, master switch on $Z^3$, wire 25, resistor 26, wire 27, auxiliary heater 18 for thermostat G, wire 28, auxiliary heater 19 for thermostat G', wire 29, auxiliary heater 20 for thermostat G'', and thence through branch return leads 30 and 31 to the voltage regulator 32 and negative main 33.

The amount of heat supplied to the enclosed space under the present assumed conditions is preferably, though not necessarily, less than when the car is in service. Thermostats G, G' and G'' are, therefore, set to function at a lower than normal temperature by means of the resistor 26 which is made to supply the required auxiliary heat to cause the said thermostat to function at any suitable temperature.

The several thermostats G, G' and G'', as previously indicated, control the relays F, F' and F'', respectively. Inasmuch as the relays F, F' and F'' are energized by similar circuits connected in parallel and the relays function to control similar parallel circuits to the several valve actuating solenoids E, E' and E'', it will be sufficient to describe the operation of relay F and identify the corresponding parts of relays F' and F'' with corresponding reference characters having exponents agreeing with the relays.

The energizing circuit for relay F leads from the positive branch 22 through wire 34, resistor 35 and wire 36, through solenoid coil 37, thence through wire 38, resistor 39 and wire 40 to return lead 31, regulator 32 and negative line 33. This energizing circuit remains effective as long as the mercury column of the thermostats G, G' and G'', as the case may be, remain out of engagement with the outer thermostat contact. However, as soon as the said mercury column engages the outer contact of the thermostat, the electric current is by-passed around relay coil 37 through wires 41 and 42; thereby deenergizing the relay F and permitting spring 43 to move its bridge arm 44 to close a circuit through valve solenoid E to close valve 14. This valve closing circuit leads from positive line 21 through wire 45, bridge arm 44 of relay F, wire 46, coil 47 of solenoid E and wire 48 to negative line 33.

In order to insure that the valves for the longer radiators B and C will remain open for a sufficient length of time to completely fill the radiators with a steam, a connector 49 having a resistor 50 interposed therein leads from wire 27 to fixed contact $50^a$ of relay F. This connection is in advance of the auxiliary heaters 18, 19 and 20 and leads to the negative line 33 through contact $50^a$, wire 46, solenoid 47 of valve E and wire 48. The current passing through resistor 50 is insufficient to actuate valve solenoid 37, but merely serves to divert a portion of the current from wire 27 and consequently from the auxiliary heaters 18, 19 and 20 when the relay bridge arm 44, and consequently the radiator valve, is open, thereby reducing the self-cycling effect of the thermostat G and thereby delaying the closing of the radiator valve. When the relay bridge arm is closed, some additional heating current is supplied to auxiliary heaters 18, 19 and 20 of said thermostats G, G' and G'' through a reverse circuit leading from contact $50^a$ through wire 49 and resistor 50 to wire 27, and thence to said heaters. This additional flow of electric current to the auxiliary heaters of thermostats G, G' and G'' serves to retard the cooling of these thermostats and thereby to decelerate the opening of the relay contacts and consequently the opening of the valves by means of spring 15.

The connector 49 and resistor 50 may be omitted from the circuits of relay F'', since this relay is used in connection with a relatively short radiator D.

*Combined operation of overhead and floor radiators*

When the car is put into active service, it will be desirable to maintain a higher temperature in the space A than contemplated by the control circuits for the separate operation of the floor radiators as previously described. In order to obtain the desired temperatures the master switch is operated to close its switch arms $Z^1$, $Z^2$ and open its arm $Z^3$. When this change in the position of the switch arms occurs, it will be assumed that the temperature of the enclosed space A is below 60° F. and all inside thermostats are open at their contacts.

Under the assumed condition, steam will be supplied to all floor radiators B, C and D, since their steam supply valves 14 are normally open when their associated thermostats G, G' and G'' are open at their contacts. Steam will, therefore, be supplied to the floor radiators until the temperature at thermostats G, G' and G'' is sufficient to cause them to function. During this initial heat up of the car, the said thermostats G, G' and G'' will receive auxiliary heat only through resistor 50, since the main circuit for heaters 18, 19 and 20 is controlled, as hereinafter described, by the operation of the overhead heat relay K.

The electric circuit for the conjoint control of overhead and floor radiators passes from positive line 21 and branch lead 22 thereof, through master switch arm Z² to branch lead 51. Inasmuch as the assumed temperature is below 60° F., the thermostat N will be open at its contacts and the fan relay AA will be deenergized to open its bridge arm 73. Consequently, the electric current will flow through branch lead 51 only to terminal 53, thence through wire 54, resistor 55 and wire 56 to the solenoid coil 57, wire 58, resistor 59 and wire 31 through regulator 32 to the negative line 33. The energization of the solenoid coil 57 actuates the relay K so as to close its contact 62 and thereby close an energizing circuit through coil 64 of the solenoid J to actuate the steam supply valve 16. This circuit leads from positive line 21 through wire 61, contact 62 of relay K, wire 63, energizing coil 64 of solenoid J, thence through wire 65 to the negative line 33. As long as the solenoid J is energized, the steam supply valve 16 will be held open to direct steam into the overhead heater H. During the initial heat up the fan M remains inactive. In fact, the fan remains inactive until the temperature adjacent the overhead heater rises to 60° F. Simultaneously with the closing of the contacts 62 of relay K, a circuit is closed through the fan pilot relay AA. This circuit leads from wire 63 through wire 66, through resistor 67, wire 68, solenoid coil 69 of relay AA, wire 70, resistor 71, and wires 72 and 31 to the regulator 32 and thence to the negative line 33. The energization of the said solenoid coil 69 closes the contact 73 of relay AA. The closing of this contact actuates relay BB and thereby prevents the energization of the fan motor M. However, as soon as the temperature rises to 60° F., the mercury column of the thermostat N will engage its outer contact (contact 60° F.). This condition by-passes the current around the solenoid coil 69 and thereby deenergizes the relay AA so as to permit the contact 73 to return to its open position. The said closing of this contact establishes an energizing circuit through the fan M as follows: The circuit leads from wire 51, through the closed contact 73 of relay AA, wire 74, solenoid coil 75 of the fan relay BB, wires 76 and 31 to the regulator 32, and thence to the negative line 33. The energization of solenoid coil 75 closes the movable contact 77 of relay BB so as to close a circuit through the fan M leading from positive line 21 through wire 78, contact 77 of relay BB, wire 79, motor M, and wire 80 through the regulator 32 to the negative line 33. The operation of the fan will continue until its energizing circuit is broken at relay K which result is accomplished only when the thermostat L functions, that is to say, until the temperature of the enclosed space plus the auxiliary heat aggregates a temperature of 76° F. at the thermostat. When the mercury column of the said thermostat engages the outer contact thereof, the electric current is by-passed around the coil 57 through wires 81 and 82. When this occurs, the spring 83 (Fig. 4) functions to open the valve energized circuit at the contact 62.

*Cycling of floor radiator thermostat*

When the relay K is deenergized to open its bridge arm 62, as above described, it also functions to close a bridge arm 84 and thereby closes an auxiliary heater circuit through the floor radiators G, G', G''. In this way the system accelerates the functioning of the thermostats G, G', G'' so as to close the floor radiator valves. This heater circuit leads from wire 61, through wire 85, bridge arm 84 of relay K, wire 86, resistor 87, and wires 88 and 27, and thence through heater coils 18, 19 and 20 by the circuit connections previously described, except for the fact that the heater circuit to heaters 18, 19 and 20 is connected through the relay K so as to impart a delayed cycling action to the floor radiator thermostats.

*Overhead thermostat control*

The functioning of the overhead heater H, as before indicated, is controlled by the thermostat L through the relay K. The thermostat L is provided with auxiliary heater 89 which is in circuit with auxiliary heaters 90 and 91 of thermostats U and X respectively. The thermostats L and U are each set to function at 76° F., whereas the thermostat X is set to function at 77° F. However, these settings can be raised or lowered to compensate for certain temporary or transitory conditions which make for discomfort at a temperature of 76° F. For example, if the relative humidity of the atmosphere within the enclosed space is high, it may be desirable to temporarily set the thermostat L to function at a lower temperature. Alternatively, if the relative humidity is low, it may be desirable to increase the effective setting of the thermostat L so as to provide the desired comfort for the occupants of the space. These adjustments are accomplished by the manual operation of a three-point switch 92.

Assuming for the present that the thermostats L and U are set to function at 76, the energizing circuit for the auxiliary heaters 89, 90 and 91 leads from wire 51 at terminal 93, through switch 92, contact 94, wire 95, resistor 96, wire 97, auxiliary heater 91 of thermostat X, wire 98, auxiliary heater 90 of thermostat U, wires 99, 100 and 101 through auxiliary heater 89 and thence through wires 102, 30 and 31 through the regulator 32 to the negative line 33. If the relative humidity of the atmosphere within the space is high or if for any other reason the heating system has a tendency to cause discomfort at 76° F., the switch 92 is moved to close the circuit through contact 103 and wire 104, through resistor 105 to wire 106, to wire 97, and thence through the several auxiliary heaters. The resistor 105 is such as to permit more current to flow through the auxiliary heaters 89, 90 and 91, and thereby reduces the effective setting of the thermostats L, U and X. If the relative humidity within the controlled space is low so as to make it desirable to increase the effective setting of thermostats L, U and X, this is accomplished by turning the switch 92 to close the circuit through contact 108 thereof and thereby direct current through wire 109, resistor 110 to the wire 97 and thence through the said auxiliary heaters.

Cycling of overhead heater thermostat

When the relay K is closed so as to direct steam into the overhead heater H, additional current is supplied to the auxiliary heater 89 of thermostat L to cause a cycling operation of the thermostat. The additional current for supplying this heat follows a circuit leading from wire 66 through wire 111, resistor 112, wire 113, contact 114 of relay AA and wires 115, 100 and 101 to the auxiliary heater 89 and thence to the negative line in the manner previously described.

The cycling action of the control thermostats for both the overhead radiator and the several floor radiators is continued until the temperature of the enclosed space plus the normal amount of auxiliary heat to the said thermostats is sufficient to move their respective mercury columns into engagement with their outer contacts. If for any reason the overhead thermostat L should be permanently closed at 76° F., while the temperature near the floor is below 76° F., the thermostats G, G', G'' will function independently until the desired floor temperature is obtained.

Transfer to cooling function

If the outside temperature is below the setting of outside thermostat Y, to-wit, 40° F., the cooling function of the air conditioning system will remain inoperative notwithstanding the fact that the temperature of the car stands at the normal setting for the transfer of the control from the heating apparatus to the cooling apparatus. This transfer will not take place unless the outside temperature is such as to cause the mercury column of thermostat Y to engage its upper contact and thereby put the control thermostat U for the No. 1 cooler into control of the system. Under such conditions a circuit is established leading to terminal 116 in branch lead 51, through wire 117, resistor 118, wires 119 and 120 through the mercury column of thermostat U to wire 121, wires 122 and 123, through mercury column of thermostat Y, thence through wire 124, solenoid coil 125 of relay T, and thence through wires 126 and 31 through the regulator 32, to the negative line 33. This circuit energizes relay T so as to close its contact 127, thereby establishing a circuit for supplying additional current to all heater control thermostats within the car. This additional heat makes certain that the circuits through these several heater thermostats will not be readily broken by any slight fall in the temperature of the space A. This additional heat supplied to the radiator thermostats makes certain that the cooling apparatus will continue to operate until the temperaure of the controlled space is lowered sufficiently to open the circuit of the contacts of thermostat U. In fact, even though the operation of the cooling apparatus has ceased, the cooling thermostats will be regarded as in control until the auxiliary heaters of thermostat L cools sufficiently to break the circuit at its contacts and thereby relieve the cooling thermostat from further control. The circuit for supplying the additional auxiliary heat to the radiator thermostats leads from contact 128 of relay BB through wire 129, master switch Z¹, wire 131, contact 127 of relay T, wire 132 to terminal 133, (Fig. 7) thence through wire 134, resistor 135, wires 136 and 101 to the auxiliary heater 89 of the overhead thermostat L. The circuit through the auxiliary heaters for the floor thermostats leads from terminal 133 through wire 132, resistor 137 to wires 88 and 27, and thence through the auxiliary heaters 18, 19 and 20 by the regular heater circuit previously described.

It will be seen that when the cooling thermostat U is in control of the system, a large amount of heating current is supplied through resistor 135 to overhead heater thermostat L and through resistor 137 to the floor heater thermostats so as to make both the overhead and floor radiators of the heating system ineffective. The circuit in which this resistor 135 is interposed tends to divert heating current from the heaters 90 and 91 of the cooler thermostats U and X. In order to compensate for this loss of heat, additional current is supplied to said heaters 90 and 91 through resistor 107.

No. 1 cooler control circuits

When the relay T (Figs. 6 and 7) is energized by the functioning of the No. 1 cooler thermostat U, a circuit is closed leading from wire 131, through wire 138, contacts 139 of relay T and wire 140 through the motor of compressor O to wire 31 leading to the regulator 32 and negative line 33. The valve S for supplying refrigerant to No. 1 cooler is opened by means of a circuit leading from wire 140 through wire 141, valve S and wire 31, and thence to the negative line 33. There is no self-cycling of the No. 1 cooler mechanism or its controls. When it is set into operation, it continues to operate until the temperature conditions within the space drops sufficiently to cause the mercury columns of its thermostat to recede from its outer contact. The cooler thermostats, however, will remain in technical control until the auxiliary heaters of the overhead radiator thermostat cools sufficiently to open the circuit at its contacts. It usually requires a substantial period of time to dissipate from the thermostats the additional heat supplied thereto while the thermostat U was functioning.

No. 2 cooler control circuits

If No. 1 cooler fails to maintain a sufficiently cool temperature within the controlled space, for example, if the temperature rises sufficiently to cause thermostat X to function, No. 2 cooler is put into operation so as to increase the cooling effect within the controlled space. The operation of No. 2 cooler is effected by merely opening and closing valve V. This cooler, therefore, can be readily cut in and out of the cooling system without undue strain on the electrical system and, therefore, is cut in and out of the system as often as may be necessary to maintain the enclosed space cooled to the desired temperature.

The energizing circuits for relay W and valve V are as follows: When the No. 2 cooler thermostat X functions to close a circuit at its contacts, the circuit leads from wire 51, through wire 143, resistor 144, wire 145, mercury column of thermostat X, wire 146, solenoid coil 147 of relay W, and wires 148 and 31 to negative line 33. The energization of relay W closes a circuit to supply additional heater current to No. 1 cooler thermostat so as to insure that this thermostat will continue to function. This booster circuit for heater 90 leads from wire 51 through wires 149 and 150, contact 151 of relay W, resistor 152 and wires 153 and 98 through the said heater 90. This circuit, in addition to boosting the temperature of heater 90, diverts current from auxiliary heater 91 and thereby causes self-cycling of No. 2 cooler thermostat X. The energization of relay W also closes an actuating circuit for valve V. The circuit leads from wire 51 through wire 149, contact 154 of relay W and wire 155, valve V (Fig. 6), and wires 156 and 31 back to the negative line 33.

*Differential adjustment of thermostats*

When the heating system is functioning and the outside temperature is above 30° F., or other temperature for which contact 157 of thermostat CC is set to function, additional heating current is supplied to the overhead radiator thermostat L so as to adjust the thermostats X, U and L to a lower setting. This circuit leads from wire 51 through wire 157, resistor 158, wire 159, mercury column of thermostat CC, wires 160 and 106 to wire 97, thence through auxiliary heaters 91, 90 and 89 so as to adjust these thermostats to a lower setting. It will be seen, therefore, that when the outside temperature is below 30° F., the controls will function at a higher temperature, but when said outside temperature is at or above 30° F., the thermostat will function at a slightly lower temperature.

When the mercury column engages the outer contact 161 (85° F.), additional current is supplied to the heater 89 of overhead radiator thermostat L. In this way a portion of the current for the heaters 90 and 91 is diverted so as to raise the effective setting of thermostat CC and thereby reduce the differential between the inner and outer temperatures.

This circuit leads from the contact 161 of thermostat CC through wire 162, resistor 163, wire 164 to wires 165, 99, 100, 101 through the heater coil 89 of thermostat L and thence through wires 102, 30 and 31 to the regulator 32 and negative line 33.

It is sometimes desirable during the functioning of the heating system to operate the fan M even though the circuit through the relay contact 73 is broken. This can be done by closing the switch 166 which by-passes the current around the relay AA from wire 51 to wire 74 and therefore makes the fan M effective as long as switches 169 and Z² are closed.

*Sensible heat control thermostats*

Referring now to modified circuits illustrated in Fig. 8 of the drawing: This modification includes the use of three thermostats of the type shown in copending application, Serial No. 512,698, filed December 3, 1943, now Patent No. 2,470,188 of May 17, 1949, by Lewis B. Rhodes and Timothy J. Lehane. The said thermostats are designated L', U' and X', since their positions in the circuit correspond to the position of thermostats L, U and X of the previous embodiment and function at temperatures having comfort values corresponding to the dry bulb temperatures mentioned in connection with the thermostats L, U and X. The specific construction and operation of the said thermostats will appear more fully from the said copending application, Serial No. 512,698. However, it will be sufficient for the present disclosure to state that the thermostats function in response to the effective temperature of the enclosed space in that they are provided with a wet bulb 167 which responds to the cooling effect incident to the evaporation of moisture and a dry bulb 168 which responds to the temperature within the enclosed space and also to the auxiliary heat supplied thereto by means of the electric heaters 169, all of which are connected in series in the same manner as indicated in the previous embodiment so that the several thermostats may be selectively set to function at a temperature which will provide the greatest comfort to the occupants of the space. By utilizing the thermostats L', U' and X' the overhead heater and the No. 1 and No. 2 coolers will be controlled in accordance with combined wet and dry bulb temperature of the atmosphere within the space. It is possible, therefore, with the present modification to eliminate the switch 92 and the alternative resistances 105 and 110 of the previous embodiment. However, in other respects the circuits shown in Fig. 8 agree with the corresponding portions of the circuits shown in Figs. 6 and 7 of the drawings and have, therefore, been identified with the same reference characters with additional prime exponents.

We claim:

1. In combination with means for altering the temperature of the air within an enclosed space, means including a thermostat within said space for controlling said temperature altering means, an electric heater for applying auxiliary heat to said thermostat whereby it functions at a temperature higher than the temperature of said space, an energizing circuit for said heater, and means for varying the amount of auxiliary heat to said thermostat comprising a second circuit connected in parallel with the heater energizing circuit, a relay for opening and closing said second circuit, a relay actuating circuit in series with said thermostat so as to be closed by the functioning of the thermostat, and a branch connector leading from said relay for connecting said parallel circuits in advance of said electric heater.

2. In combination with separately operable means for heating the air within an enclosed space, means for controlling said heating means including a thermostat within said space for each heating means, electric heaters for applying auxiliary heat to said thermostats whereby they will function at a temperature higher than the temperature of the enclosed space; an energizing circuit for said heaters, and means for varying the amount of heat supplied to said thermostats comprising separate circuits connected in parallel with said heater circuit, separate relays for opening and closing each of said second circuits, separate relay actuating circuits controlled by each of said thermostats, and impedance branch connections leading from the relay in each of said circuits to positions in advance of the heaters in said heater energizing cidcuit.

3. In combination with means for altering the temperature of the air within an enclosed space, means including a thermostat within said space for controlling said temperature altering means, an electric heater for applying auxiliary heat to said thermostat whereby it functions at a temperature higher than the temperature of the enclosed space, an energizing circuit for said heater, a connector defining a second flow path for electricity to said electric heater, means including a second thermostat located within said space and a relay controlled thereby for opening and closing said second flow path for electric current, an electric heater circuit for the second thermostat, and means including a third thermostat and a relay in circuit therewith for opening and closing an electric heater circuit for the second mentioned thermostat.

4. In combination with means for altering the temperature of the air within an enclosed space, means including a thermostat within said space for controlling said temperature altering means, an electric heater for applying auxiliary heat to said thermostat whereby it functions at a temperature higher than the temperature of the enclosed space, an energizing circuit for said heater, a connector defining a second flow path for electric current to said heater, means including a second thermostat located within said space and a relay controlled thereby for opening and closing said second flow path for electric current, an electric heater for the second thermostat, and means including a pair of thermostats one of which is responsive to the temperature within the enclosed space and the other of which is responsive to the outside temperature and a relay in circuit therewith for opening and closing an electric heater circuit for the second mentioned thermostat.

5. In combination with means for altering the temperature of air within an enclosed space, means including a thermostat within said space for controlling said temperature altering means, an electric heater for applying auxiliary heat to said thermostat whereby it functions at a temperature higher than the temperature of the enclosed space, an energizing circuit for said electric heater, means defining a second flow path for electric current to said heater, and means for opening and closing said second flow path for electric current comprising a relay and a pair of thermostats connected in series for opening and closing a circuit for actuating said relay.

6. In combination with means for altering the temperature of air within an enclosed space, means including a thermostat within said space for controlling said temperature altering means, an electric heater for applying auxiliary heat to said thermostat whereby it functions at a temperature higher than the temperature of the enclosed space, an energizing circuit for said electric heater, means defining a second flow path for electric current to said heater, means for opening and closing said second flow path for electric current comprising a relay and a pair of thermostats connected in series for opening and closing a circuit for actuating said relay, and means including an outside thermostat operatively connected with the heater for the first mentioned thermostat and adapted to function upon a predetermined outside temperature to close an additional heating circuit through the said electric heater.

7. In combination with apparatus selectively operable for heating or cooling an enclosed space, means for controlling the respective functions of said apparatus comprising a heating control thermostat responsive to the temperature of the enclosed space for controlling the heating function of said apparatus, a cooling control thermostat responsive to the temperature of the enclosed space for controlling the cooling function of said apparatus, electric heaters for both thermostats and an energizing circuit therefor for adjusting the thermostats to operate at substantially the same temperature, and a second energizing circuit controlled by the operation of said cooling control thermostat and adapted when closed to apply additional heating current to the heating control thermostat, whereby the heating control thermostat is automatically adjusted to a lower temperature setting when said cooling control thermostat takes control of said apparatus.

8. In combination with apparatus selectively operable for heating or cooling an enclosed space, means for controlling the respective functions of said apparatus comprising a heating control thermostat responsive to the temperature of the enclosed space for controlling the heating function of said apparatus, a cooling control thermostat responsive to the temperature of the enclosed space for controlling the cooling function of said apparatus, electrically energized heaters for both thermostats adapted to adjust the thermostats to substantially equal temperature settings, an auxiliary energizing circuit controlled by the operation of said cooling control thermostat and adapted when closed to apply additional heating current to the heating control thermostat, whereby the heating control thermostat is automatically adjusted to the lower temperature setting when said cooling control thermostat takes control of said apparatus, and a thermostat responsive to the outside temperature and adapted to render the operation of the cooling control thermostat ineffective when the outside temperature is below a predetermined minimum.

9. In combination with apparatus selectively operable for heating or cooling an enclosed space, means for controlling the respective functions of said apparatus comprising a heating control thermostat responsive to the temperature of the enclosed space for controlling the heating function of said apparatus, a cooling control thermostat responsive to the temperature of the enclosed space for controlling the cooling function of said apparatus, electrically energized heaters for both thermostats adapted to adjust the thermostats to substantially equal temperature settings, an auxiliary energizing circuit controlled by the operation of said cooling control thermostat and adapted when closed to apply additional heating current to the heating control thermostat, whereby the heating control thermostat is automatically adjusted to the lower temperature setting when said cooling control thermostat takes control of said apparatus, and a thermostat responsive to the outside temperature and connected in series with the cooling control thermostat so as to render it ineffective when the outside temperature is below a predetermined minimum.

10. In combination with apparatus selectively operable for heating or cooling an enclosed space, means for controlling the respective functions of said apparatus comprising a heating control thermostat responsive to the temperature of the enclosed space for controlling the heating function of said apparatus, a cooling control thermostat responsive to the temperature of the enclosed space for controlling the cooling function of said apparatus, electrically energized heaters for both thermostats adapted to adjust the thermostats to substantially equal temperature settings, an auxiliary energizing circuit controlled by the operation of said cooling control thermostat and adapted when closed to apply additional heating current to the heating control thermostat, whereby the heating control thermostat is automatically adjusted to the lower temperature setting when said cooling control thermostat takes control of said apparatus, a thermostat responsive to the outside temperature connected in series with the cooling control thermostat so as to render it ineffective when the outside temperature is below a predetermined minimum, and a second thermostat responsive to the outside temperature and operative above a predetermined maximum to close a circuit for directing additional heating current to said heating control thermostat and to divert a portion of the electric current away from the heater of the cooling thermostat, whereby the last mentioned thermostat is automatically adjusted to a higher temperature setting.

11. In combination with apparatus selectively operable for heating or cooling an enclosed space, means for controlling the respective functions of said apparatus comprising a heating control thermostat responsive to the temperature of the enclosed space for controlling the heating function of said apparatus, a cooling control thermostat responsive to the temperature of the enclosed space for controlling the cooling function of said apparatus, electric heaters for both thermostats connected in series and adapted to adjust the thermostats to substantially equal temperature settings, a second energizing circuit controlled by the operation of said cooling control thermostat and adapted when closed to apply additional heating current to the heating control thermostat, whereby the heating control thermostat is automatically adjusted to the lower temperature setting when said cooling control thermostat takes control of said apparatus, a thermostat responsive to the outside temperature connected in series with the cooling control thermostat so as to render it ineffective when the outside temperature is below a predetermined minimum, and a second thermostat responsive to the outside temperature and operative above a predetermined minimum to close an additional heater circuit through said heater of the said heating control circuit and also operative above a predetermined maximum temperature to close a circuit serving to reduce the heating current to the cooling control thermostat whereby this thermostat is automatically adjusted to operate at a higher temperature and thereby decrease the differential between the temperature of said enclosed space and the outside temperature.

12. In combination with apparatus selectively operable for applying heat to the atmosphere in the upper and lower portions of an enclosed space or for cooling the said space, the said cooling portion of the apparatus including a plurality of separately controlled sections, means for controlling the respective functions of said apparatus comprising heating control thermostats responsive to the temperature within the enclosed space having auxiliary electric heaters and circuits therefor whereby the several thermostats are normally set to operate at a predetermined temperature, a primary cooling control thermostat responsive to a predetermined temperature within the enclosed space for controlling one section of the cooling portion of said apparatus, a secondary cooling control thermostat, responsive to a higher temperature than the primary cooling thermostat, for controlling another section of the cooling portion of said apparatus, auxiliary heaters for the said cooling control thermostats, energizing circuits for said heaters whereby they may be set to operate at the temperatures selected, an outside thermostat connected in series with cooling control thermostat of lowest setting and adapted to render the cooling control thermostat ineffective below a predetermined outside temperature, a second outside thermostat operable above a predetermined minimum to supply additional heating current to all heating control thermostats, whereby all of these thermostats are automatically set to lower operating temperatures and also operate at a predetermined maximum outside temperature to close a circuit for reducing the auxiliary heat on the cooling control thermostats whereby these thermostats are automatically adjusted to higher temperature settings so as to reduce the temperature differential between the temperature of the enclosed space and the existing outside temperature.

13. In combination with apparatus selectively operable for heating or cooling an enclosed space, means for controlling the respective functions of said apparatus comprising a plurality of thermostats responsive to the temperature and relative humidity of the atmosphere within the space and adapted to function at predetermined comfort temperatures, one of said thermostats being adapted to control the heating function and another of said thermostats being set to control the operation of the cooling apparatus, means for selectively setting the several thermostats at predetermined functioning temperatures comprising auxiliary heaters for each of said thermostats, and an energizing circuit for connecting said heaters in series whereby all of said thermostats may be adjusted up or down without changing the setting between certain of the thermostats.

14. In combination with apparatus selectively operable for heating or cooling an enclosed space, means for controlling the respective functions of said apparatus comprising an effective temperature thermostat for controlling the heating apparatus and responsive to the effective temperature of the enclosed space, a thermostat responsive to the temperature and relative humidity of the atmosphere within the enclosed space for controlling the operation of the cooling apparatus, electric heaters for both thermostats and an energizing circuit therefor for adjusting the thermostats to operate at substantially the same temperature, and a third thermostat responsive to a higher temperature within the enclosed space for controlling a part of said cooling apparatus.

15. In combination with apparatus including a heat radiator and a fan for forcing heated air into an enclosed space, an electrically operated valve for controlling the supply of steam to said radiator, means providing an energizing circuit for opening said valve to admit steam to said radiator, a relay for closing said valve energizing circuit, a second relay, means providing an energizing circuit for said second relay which is effective only when the first relay is energized, a third relay effective when deenergized to close an energizing circuit through said fan motor, connectors providing an energizing circuit for said relay connected through said second relay and adapted to be closed by the energization of the second relay, means including a thermostat responsive to temperature changes adjacent said radiator for shunting the electric current around the second relay, whereby the energizing circuit for the said third relay can be opened only when the first and second mentioned relays are closed.

TIMOTHY J. LEHANE.
EVERETT H. BURGESS.

REFERENCES CITED

The following references are of record in the file of this patent:

UNITED STATES PATENTS

| Number | Name | Date |
|---|---|---|
| 1,814,585 | Bradbury | July 14, 1931 |
| 2,108,507 | Parks et al. | Feb. 15, 1938 |
| 2,137,833 | Crago | Nov. 22, 1938 |
| 2,155,256 | Crago | Apr. 18, 1939 |
| 2,194,245 | McGoldrick | Mar. 19, 1940 |
| 2,282,013 | Wetzsteon | May 5, 1942 |
| 2,323,236 | Parks et al. | June 29, 1943 |
| 2,346,592 | Lehane | Apr. 11, 1944 |